United States Patent [19]

Carnell et al.

[11] Patent Number: 4,978,439
[45] Date of Patent: Dec. 18, 1990

[54] DESULPHURISATION USING SOLID SORBENTS

[75] Inventors: Peter J. H. Carnell, Stockton-on-Tees; Patrick J. Denny, Croft-on-Tees, both of United Kingdom

[73] Assignee: Imperial Chemical Industries PLC, London, England

[21] Appl. No.: 311,830

[22] Filed: Feb. 17, 1989

[51] Int. Cl.$^5$ .............................................. C10G 25/00
[52] U.S. Cl. ...................................... 208/91; 208/211; 208/247
[58] Field of Search .................... 208/85, 91, 211, 213, 208/209, 247, 247, 89

[56] References Cited

U.S. PATENT DOCUMENTS

| | | | |
|---|---|---|---|
| 2,772,212 | 11/1956 | Seyfried | 208/111 |
| 2,925,375 | 2/1960 | Fleck et al. | 208/91 X |
| 2,959,538 | 11/1960 | Weikart et al. | 208/347 X |
| 3,069,350 | 12/1962 | Ramella | 208/211 |
| 4,090,951 | 5/1978 | Smith | 208/91 X |
| 4,568,452 | 2/1986 | Richmond | 208/211 X |

Primary Examiner—Glenn Caldarola
Attorney, Agent, or Firm—Cushman, Darby & Cushman

[57] ABSTRACT

Desulphurization process for feedstocks in which the sulphur compounds contained therein are first separated into a concentrate stream which is then hydro-desulphurized, and the resulting hydrogen suphide removed using conventional sulphur removal techniques. The initial separation is preferably effected using membrane separation or temperature swing absorption processes.

10 Claims, 1 Drawing Sheet

DESULPHURISATION USING SOLID SORBENTS

This invention relates to desulphurisation and in particular to the removal of organic sulphur compounds, such as mercaptans, organic sulphides, carbonyl sulphide, and carbon disulphide, as well as any hydrogen sulphide present, from a liquid or gaseous feedstock stream, particularly a feedstock stream comprising a hydrocarbon such as natural gas. Such hydrocarbon feedstock streams often contain substantial amounts of organic sulphur compounds and hydrogen sulphide as aforesaid; for example where the feedstock stream comprises a gaseous hydrocarbon, the amount of such sulphur compounds may be in an excess of 50 ppm by volume expressed as equivalent hydrogen sulphide.

For many applications, before use of the feedstock stream, it is generally desirable to remove such sulphur compounds to a low level. Generally, the maximum acceptable sulphur content will depend on the intended use of the treated feedstock. Thus for example where the feedstock stream is to be subjected to some catalytic reactions, the maximum acceptable sulphur content may be below 1 ppm, or even below 0.1 ppm, by volume expressed as equivalent hydrogen sulphide. In other applications the specification may be, for example, a maximum sulphur content of 30 ppm, or a maximum hydrogen sulphide content of 3 ppm by volume.

One method of sulphur compound removal that is particularly effective for the removal of hydrogen sulphide is to contact the feedstock stream with an absorbent liquid or with a bed of particles of a suitable particulate sorbent, such as zinc oxide. However, such techniques are not particularly effective for the removal of the aforesaid organic sulphur compounds. Accordingly it is customary to subject the feedstock stream to hydrodesulphurisation (hereinafter also referred to as HDS) by passage of the feedstock stream in the presence of hydrogen over a suitable catalyst, e.g. nickel and/or cobalt molybdate, often in admixture with alumina, so that the sulphur in the organic sulphur compounds is converted to hydrogen sulphide, which can then be removed by conventional sulphur compound removal methods. However such HDS processes require an appreciable hydrogen concentration in order that the organic sulphur compounds are fully converted. In some cases, particularly where large volumes of feedstock stream are to be treated, an adequate supply of hydrogen may not be available or may be costly to provide.

We have devised a process wherein the feedstock stream is subjected to a separation stage to provide a product stream having a reduced content of sulphur compounds, and a concentrate stream containing a higher concentration of the sulphur compounds, and then subjecting the concentrate stream to HDS and sulphur removal. The concentrate stream can be relatively small proportion of the volume of the original feedstock stream, but may contain a high proportion of the sulphur compounds contained within the original feedstock stream. Since the concentrate stream is smaller in volume than the feedstock stream, the amount of hydrogen that is required in order to achieve a given concentration in the concentrate stream is less than that required to achieve the same concentration of hydrogen in the feedstock stream. The process of the present invention also has the advantage that, as the volume of the stream that has to pass over the HDS catalyst is decreased, the size of the bed thereof, and/or the space velocity therethrough may be decreased. This may be advantageous even where a supply of hydrogen adequate to subject all the feedstock stream to HDS is available.

The present invention employs a separation stage, such as membrane separation or sorption using a regenerable sorbent material, e.g. a solid regenerable sorbent such as a molecular sieve, active charcoal, or alumina, or a regenerable liquid sorbent, e.g. an aqueous alkali solution, to separate the sulphur compounds from the feedstock stream as a concentrate stream.

When the separation stage is performed using a regenerable sorbent, it is usual to regenerate the regenerable sorbent by desorbing the sulphur compounds. The cycle of sorption/desorption of sulphur compounds may be conducted in a number of ways, such as using a temperature swing sorption process. In such a process the sorption stage is usually effected at a relatively low, e.g. ambient, temperature, and regeneration of the sorbent can be effected by heating to release the sorbed sulphur compounds. Using sorption with a regenerable solid sorbent, the regeneration may be effected by contacting the regenerable sorbent with a suitable regeneration fluid stream, e.g. part of the feedstock stream or product stream, heated to an elevated temperature, generally in a direction counter-current to the direction of flow when on sorption duty. The sorbed sulphur compounds, including the organic sulphur compounds, are desorbed into the regeneration fluid stream during the regeneration stage to give the concentrate stream. With a regenerable liquid sorbent, regeneration may be effected by heating, stripping with a suitable gas, and/or, in some cases, depressurisation, to produce a gaseous concentrate stream containing the desorbed sulphur compounds. With either liquid or solid regenerable sorbents, the volume of the regeneration fluid stream is relatively small in proportion to the amount of the feedstock stream that can be treated by the regenerable sorbent before regeneration thereof becomes necessary. Likewise, using membrane separation, a concentrate stream containing the sulphur compounds and representing only a small proportion of the feedstock stream may be produced.

The concentrate stream, e.g. the more concentrated sulphur compound-containing stream from a membrane or a regenerable sorbent, is then subjected to the HDS and subsequent sulphur removal stages to produce an effluent stream of reduced sulphur compound content. The effluent stream may be combined with the feedstock stream from the membrane or regenerable sorbent so that there is little or no loss of the useful feedstock stream.

Accordingly the present invention provides a process for the production of a desulphurised product stream from a sulphur compound-laden feedstock stream comprising:

(a) subjecting said feedstock stream to a separation stage to give a sulphur compound-laden concentrate stream and a product stream of reduced sulphur content;

(b) passing said concentrate stream over a hydrodesulphurisation catalyst, thereby converting sulphur in organic sulphur compounds in said concentrat stream to hydrogen sulphide and forming a hydrogen sulphide-containing stream;

(c) removing hydrogen sulphide from said hydrogen sulphide containing stream, thereby producing an- effluent stream of reduced sulphur compound content; and (d) adding said effluent stream to the product stream; and in which process hydrogen, or a compound that decomposes thereto in the presence of the hydro-desulphurisation catalyst, is present in, or is added to, the concentrate stream before passage thereof through the hydro-desulphurisation catalyst.

While membrane separation techniques may be employed to effect the concentration of the sulphur compounds and provide a product stream and concentrate stream, they suffer from the disadvantage that a significant pressure drop is liable to result in one or both of the streams therefore often necessitating compression of one, or both, streams downstream of the separation stage. It is therefore preferred to employ a regenerable solid sorbent separation stage.

Accordingly in a preferred form of the invention there is provided a process for the production of a desulphurised product stream from a sulphur compound-laden feedstock stream comprising:

(a) contacting said feedstock stream with a regenerable solid sorbent at a first temperature, said sorbent being effective at said first temperature to sorb sulphur compounds from said feedstock stream, thereby providing a product stream of reduced sulphur content;

(b) regenerating said regenerable sorbent by heating said regenerable sorbent to a second temperature at which sulphur compounds are desorbed from said regenerable sorbent, said heating being effected by contacting said regenerable sorbent with a regeneration fluid stream comprising a heated part stream from said product stream, thereby producing a sulphur compound-laden concentrate stream;

(c) passing said concentrate stream over a hydro-desulphurisation catalyst, thereby converting sulphur in organic sulphur compounds in said concentrate stream to hydrogen sulphide and forming a hydrogen sulphide-containing stream;

(d) removing hydrogen sulphide from said hydrogen sulphide-containing stream, thereby producing an effluent stream of reduced sulphur compound content; and (e) adding said effluent stream to the product stream; and in which process hydrogen, or a compound that decomposes thereto in the presence of the hydro-desulphurisation catalyst, is present in, or is added to, the regeneration fluid stream, or concentrate stream before passage thereof through the hydro-desulphurisation catalyst.

In this form of the invention the concentrate stream is thus the regeneration fluid stream, after the latter has been used for regeneration.

In a preferred form of the invention, where the regenerable solid sorbent is in the form of sorbent beds, and where it is desirable to maintain continuous production of a desulphurised product stream, two or more beds of regenerable solid sorbent are provided in parallel, such that whilst one or more of the solid regenerable sorbent beds is undergoing regeneration, another receives the sulphur compound-laden feedstock stream.

Where temperature swing sorption techniques are used, it is normally desirable, that a bed that has been regenerated by passage of regeneration fluid therethrough is cooled to the sorption temperature before the bed is returned to sorption duty. It is therefore preferred that there are at least three beds so that while one bed is on sorption duty, another is being regenerated and yet another being cooled ready to go into sorption duty when the first bed becomes loaded and in need of regeneration. Where part of the product stream is used as the regenerating fluid, cooling of a bed from the regeneration temperature to the sorption temperature may conveniently be effected by passage, through the bed undergoing cooling, of that part stream of the product stream to be used as the regeneration fluid stream for another bed, before heating thereof of the regeneration temperature.

Part of the heating of the regeneration fluid stream may be effected by indirect heat exchange between the concentrate stream i.e. the regeneration fluid stream after use for regeneration, and particularly after the HDS treatment of the concentrate stream, and the regeneration fluid stream before it enters the bed undergoing regeneration. Preliminary heating of the regeneration fluid stream, prior to such heat exchange, may be effected, as aforesaid, by use of the regeneration fluid stream for cooling a bed that has previously undergone regeneration. Such further heating of the regeneration fluid stream as may be necessary may be by indirect heat exchange with steam or in a fired heater. Where the feedstock stream comprises a combustible fluid, part thereof, or of the product stream, or of the concentrate stream before or after HDS, may be burnt as fuel for such a fired heater. In some cases, particularly where the product stream is to be subjected to downstream operations such as catalytic steam reforming, it may be desirable to effect at least some of the heating of the regeneration fluid stream by addition of steam or by direct contact of the regeneration fluid stream with a stream of hot water.

The sorption step is preferably effected at a temperature in the range 0° to 100° C. and the regeneration step at a temperature that is preferably at least 50° C. higher than the sorption temperature and which is preferably in the range 100° to 400° C. The temperature employed for HDS is preferably substantially the same as that employed for regeneration.

The HDS may be effected in known manner using, for example cobalt and/or nickel molybdate catalysts which are preferably sulphided prior to use. In order to effect HDS a minimum concentration of free hydrogen is required in the concentrate stream. The free hydrogen may already be present as such in some feedstock streams or may be added to the concentrate stream prior to passage over the HDS catalyst. Alternatively in some cases it may be possible to make the hydrogen in situ, as the concentrate stream contacts the HDS catalyst. Thus where the HDS catalyst shows activity for the shift reaction at the temperature at which the HDS is effected, and where both carbon monoxide and water, or steam, is present in the concentrate stream passage of the concentrate stream through the HDS catalyst effects the shift of carbon monoxide in the concentrate stream to form carbon dioxide and hydrogen. In such cases it may be necessary to add carbon monoxide or water to the regeneration fluid stream or concentrate stream, or to the feedstock stream where the sorption step is capable of removing carbon monoxide and/or water from the feedstock stream and the desorption step is capable of desorbing same from the sorbent. In a further alternative, where the HDS catalyst has activity, at the temperature at which the HDS is effected, for the reforming of an organic compound to hydrogen, the addition of such an organic compound, e.g. an ester, alcohol or aldehyde e.g. methanol, formaldehyde, provides a source of hydrogen.

Generally, the concentrate stream that is subjected to hydro-desulphurisation is 5-30%, particularly 10-20%, of the volume of the feedstock stream. For satisfactory HDS the concentrate stream typically contains 1-10%, particularly 2-5%, by volume of free hydrogen. Where the free hydrogen is produced in situ the amount of the compound, or compounds, giving rise to the hydrogen should be such as to produce such proportion of hydrogen.

After HDS, the hydrogen sulphide is removed Such removal of hydrogen sulphide may be effected by sorption into a suitable regenerable solid or liquid sorbent, by conversion to sulphur, or by sorption with a particulate non-regenerable sorbent such as zinc oxide. The conditions employed for the hydrogen sulphide removal will of course depend on the type of removal technique adopted.

With zinc oxide adsorbents, temperatures from ambient to about 400° C. can be employed. Generally if the hydrogen sulphide removal is effected at low temperatures, i.e. below about 150° C., a high pore value, high surface area form of zinc oxide should be employed.

Preferred zinc oxide sorbents comprise at least 60%, especially at least 80%, by weight of zinc oxide, calculated on the constituents of the particulate non-regenerable sorbent material non-volatile at 900° C. As used in the process the zinc oxide may be, at least initially, wholly or partly hydrated or in the form of a salt of a weak acid, e.g. a carbonate.

Such sorbents are preferably in the form of porous agglomerates, as may be made, for example, by mixing a finely divided zinc oxide composition with a cement binder and a little water, insufficient to give a slurry, and then granulated or extruded. In order to aid access of the heated gas stream into the particles, the latter may be provided in the form of extruded pellets having a plurality of through passages. Typically the BET surface area of the particles is at least 20, preferably in the range 50 to 200, $m^2.g^{-1}$, and the pore volume of the particles is preferably at least 0.2 $cm^3.g^{-1}$.

Since the sorption efficiency and hence the life of a zinc oxide particulate bed depends on the rate of diffusion of the zinc sulphide formed by reaction of the zinc oxide with the hydrogen sulphide towards the interior of the particle, particularly at low sorption temperatures, it is preferable to employ zinc oxide particles having a high pore volume, above 0.2 $cm^3.g^{-1}$ and high surface area, above 50 $m^2.g^{-1}$. Thus while zinc oxide particles having a lower pore volume and a surface area of the order of 25 to 30 $m^2.g^{-1}$ can be employed, the bed life at low sorption temperatures is relatively low, necessitating the use of large bed volumes to avoid premature break-through of he hydrogen sulphide into the effluent stream. By using a bed of particles of pore volume above, for example, 0.25 $cm^3.g^{-1}$ and surface area above, for example, 70 $m^2.g^{-1}$, the bed volume can be markedly reduced, e.g. to about one third of that required with particles of low pore volume and surface area 25 to 30 $m^2.g^{-1}$. The particles employed thus preferably have a surface area above 50, particularly above 70, $m^2.g^{-1}$ and a pore volume above 0.25 $cm^3.g^{-1}$.

Preferred particulate non-regenerable sorbent materials for the process have a hydrogen sulphide sorption capacity of at least 20%, especially at least 25%, of the theoretical, at a temperature of 25° C., as determined in a standard test in which a mixture of hydrogen sulphide (2000 ppm by volume), carbon dioxide (4% by volume), and methane (balance) is passed through a bed of the particles at atmospheric pressure and a space velocity of 700 $h^{-1}$ using a bed of circular cross section having a length to diameter ratio of 5.

A particularly suitable particulate non-regenerable zinc oxide material is that sold by Imperial Chemical Industries plc as "Catalyst 75-1". These particles are granules typically having a surface area of the order of 80 $m^2.g^{-1}$ and a pore volume of about 0.3 $cm^3.g^{-1}$, and an sorption capacity of about 27% of theoretical when measured by the above procedure.

Alternatively the particulate non-regenerable sorbent may comprise agglomerates of particles of an intimate mixture of oxides, hydroxides, carbonates and/or basic carbonates of copper, and zinc and/or at least one element such as aluminium as described in EP-A-243052.

The feedstock stream typically contains hydrocarbons up to those containing six carbon atoms and may be gaseous or liquid. Usually it will contain, in addition to methane, one or more of ethane, propane, propene, butanes, and butenes. The invention is also of utility with other feedstock streams, for example naphtha, carbon dioxide, refinery off gas, or the product of fractionating a gas mixture produced by cracking or hydrocracking a normally liquid hydrocarbon feedstock, or the gaseous by-product of a zeolite-catalysed conversion of a feedstock such as methanol to gasoline.

The composition of the feedstock stream, where the latter is a natural or oilfield associated gas, expressed by volume is typically:

| 10 | B 34645 |
|---|---|
| ethane | 2 to 20% |
| propane plus propene | 1 to 10% |
| butanes plus butenes | 0.5 to 5% |
| higher hydrocarbons | 0.2 to 2% |
| carbon dioxide | 0 to 20% |
| nitrogen | 0 to 20% |
| water | up to saturation |
| methane | balance. |

The sulphur compounds initially present in the feedstock stream usually include hydrogen sulphide and/or carbonyl sulphide, and possibly carbon disulphide, methyl mercaptan, diethyl sulphide, and/or tetrahydrothiophene. The total initial concentration of sulphur compounds, expressed as sulphur equivalent hydrogen sulphide, is typically in the range 10 to 1000 ppm by volume of the feedstock stream when the latter is in the gaseous phase. The process can be conducted so that substantial proportion, e.g. over 75% by volume of the sulphur content of to feedstock stream can be removed. Typically the sulphur compound content of the product is under 10, for example under 5, ppm by volume, expressed as above, but this is a matter of design, depending on the user's requirements.

The invention is illustrated by reference to the accompanying drawings which are diagrammatic flowsheets representing two embodiments of the present invention.

BRIEF DESCRIPTION OF THE DRAWINGS

Referring to FIG. 1 the system employs three vessel (1a, 1b, and 1c), each containing a molecular sieve bed capable adsorbing the sulphur compounds from the feedstock. The vessel are arranged so that while vessel (1a) is on adsorption duty, vessel (1b) is undergoing regeneration, and vessel (1c) is being cooled back to the adsorption temperature after having undergone regeneration. It will be appreciated that by means or valves, not shown, the molecular sieves are operated in a cyclic fashion. Thus when vessel (1a) becomes loaded, vessel (1c) is switched to adsorption duty, vessel (1b) to cooling, and vessel (1a) to regeneration.

Figure 1:
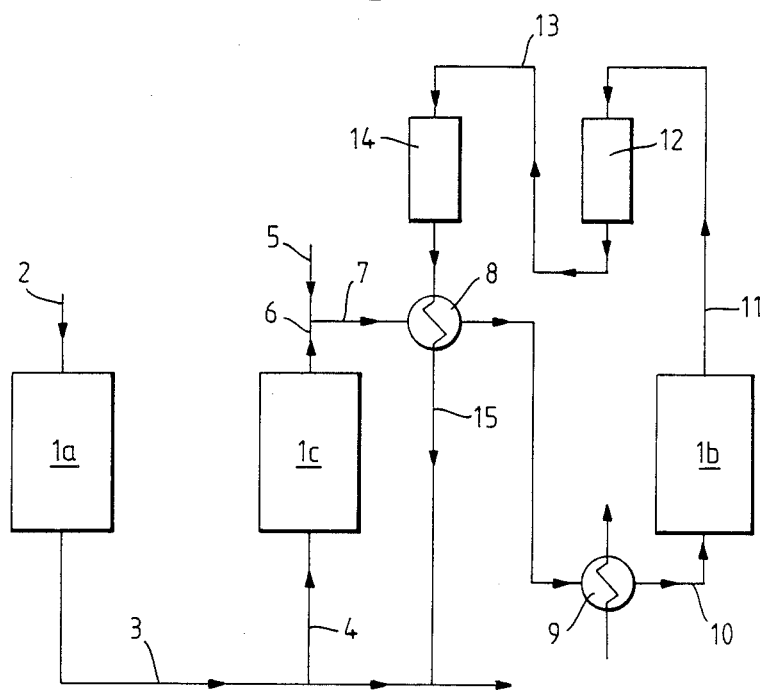
FIG. 1 illustrates a system employing a molecular sieve technique to effect concentration.

The feedstock stream, e.g. natural gas containing the sulphur compounds, is fed at a first, relatively low, temperature e.g. ambient, via line (2) to the vessel undergoing adsorption duty, i.e. vessel (1a), and the sulphur compounds are adsorbed from the feedstock stream onto the molecular sieve. The stream having a reduced sulphur compounds content leaves vessel (1a) via line (3) as a sulphur compound-depleted product stream. A part stream is taken from the product stream and fed, via line (4) and a circulator pump, not shown, through the vessel (1c) undergoing cooling. The part stream is at the relatively low first temperature and so can cool a bed that has undergone regeneration at an elevated temperature. The part stream flows in a direction counter-current to the flow of the feedstock stream through vessel (1c) when the latter was on adsorption duty. Hydrogen is added, via line (5), to the warm part stream leaving the vessel (1c) via line (6), and the resulting mixed stream is then fed, via line (7) through a first heat exchanger (8) and a second heat exchanger (9), wherein it is heated to the form the regeneration fluid stream at the desired regeneration temperature. The regeneration fluid stream is then passed, via line (10), through the vessel (1b) undergoing regeneration in a direction counter-current to the flow of the feedstock stream therethrough when that vessel was on adsorption duty. The flow of the regeneration fluid stream through the vessel (1b) causes the sulphur compounds absorbed by the molecular sieve bed in vessel (1b) during the previous adsorption cycle to be desorbed. The sulphur compound-laden regeneration fluid stream, i.e. the concentrate stream, is then fed, via line (11), through a bed (12) of a HDS catalyst effective to convert the sulphur in the organic sulphur compounds in the concentrate stream to hydrogen sulphide at the regeneration temperature, and then, via line (13), through a bed (14) of a material that is effective to absorb hydrogen sulphide from the concentrate stream at the temperature exit the HDS catalyst in bed (12).

The desulphurised effluent stream leaving bed (14) is then fed as the heating medium through the first heat exchanger (8) and then recombined, via line (15), with the product stream (3). The heat exchange in heat exchanger (8) serves to cool the effluent stream and at the same time effect some heating of the mixed stream en route to heat exchanger (9) and vessel (1b). The rest of the heating required to heat the mixed stream leaving heat exchanger (8) en route to bed (1b) is effected in the second heat exchanger (9) wherein the heating medium may be any suitable source of heat. Often steam will be raised in a downstream operation of the the plant using the product stream and so such steam may be used to effect this heating. Since during the initial part of the desorption cycle the concentrate stream will be relatively cool, but will be laden with desorbed sulphur compounds, it may be desirable to heat the concentrate stream after leaving the bed undergoing desorption and before entry in the bed of HDS catalyst. Thus a further heat exchanger (not shown) may be provided in line (11) between vessel (1b) and bed (12).

It will be appreciated that at the end of the regeneration stage, bed (1b) will be at an elevated temperature and so during the next cycle, when bed (1a) is undergoing regeneration and bed (1c) is on adsorption duty, the part stream taken from the product stream is fed through bed (1b) to effect cooling thereof.

Figure 2:
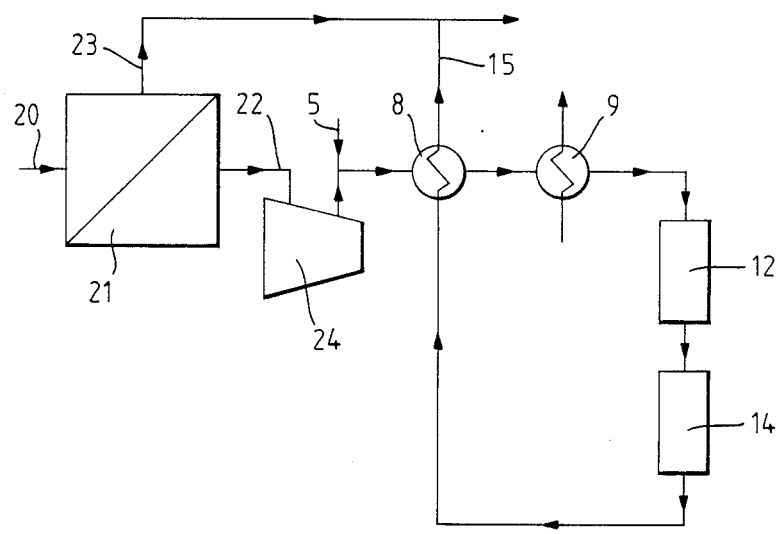
FIG. 2 depicts the concentration of feedstock using a membrane separation unit.

In the system shown in FIG. 2, the feedstock stream fed, via line (20), to a membrane separation unit (21) from which there is obtained a permeate stream (22) and an impermeate stream (23). It is assumed for the purposes of this flowsheet that the sulphur compound-laden concentrate stream is the permeate stream (22) while the sulphur compound-depleted product stream is the impermeate stream (23). It will be appreciated that whether this is the case will depend on the nature of the membrane employed and on the constituents of the feedstock. The permeate, containing the sulphur compounds, represents only a minor proportion of the feedstock stream fed to the membrane separation unit (21). This permeate is compressed in compressor (24) and mixed with hydrogen supplied via line (5) and then fed through first and second heat exchangers (8) and (9) as in the embodiment of FIG. 1 to effect heating of the permeate to the required HDS temperature. The heated permeate then is fed, as in the embodiment of FIG. 1 through a bed (12) of a HDS catalyst and a bed of an absorbent for hydrogen sulphide before being used as the heating medium in heat exchanger (8) and return, via line (15), to the product impermeate stream (23).

It will be appreciated that the hydrogen required for HDS may be added at any suitable stage, e.g. in the embodiment of FIG. 1, before passage through bed (1c) or after passage through bed (1b). Thus instead of adding the hydrogen to the part stream leaving bed (1c) prior to entry of the into heat exchanger (8), it may be more convenient to add it to the concentrate stream in line (11), i.e. after leaving bed (1b).

Where there is hydrogen in the feedstock, and in the case of the FIG. 2 embodiment this passes into the permeate stream containing the sulphur compounds, no addition of hydrogen may be necessary.

Where the presence of hydrogen in the product stream is undesirable, any excess of hydrogen remaining after HDS may be removed by passage over a suitable catalyst, e.g. copper oxide, optionally stabilised with zinc oxide, to convert the hydrogen to water. This step is preferably effected after removal of the hydrogen sulphide in bed (14). The effluent stream, from bed (14), and after passage through any such bed for removing hydrogen, may be dried, if necessary, for example by means of a molecular sieve drier. Such drying may take place before or after return of the effluent stream to the product stream.

We claim:

1. A process for the production of a desulphurised product stream from a sulphur compound-laden feedstock stream, wherein at least some of said sulphur compounds are organic sulphur compounds, comprising:
    (a) subjecting said feedstock stream to a separation stage to give a sulphur compound-laden concentrate stream and a product stream of reduced sulphur content;

(b) passing said concentrate stream over a hydro-desulphurisation catalyst, thereby converting sulphur in organic sulphur compounds in said concentrate stream to hydrogen sulphide and forming a hydrogen sulphide-containing stream;

(c) removing hydrogen sulphide from said hydrogen sulphide-containing stream, thereby producing an effluent stream of reduced sulphur compound content; and (d) adding said effluent stream to the product stream; and in which process hydrogen, or a compound that decomposes thereto in the presence of the hydro-desulphurisation catalyst, is present in, or is added to, the concentrate stream before passage thereof through the hydro-desulphurisation catalyst.

2. A process according to claim 1 wherein said separation stage comprises contacting said feedstock stream with a regenerable solid sorbent at a first temperature, said sorbent being effective at said first temperature to sorb sulphur compounds from said feedstock stream, thereby providing the product stream of reduced sulphur content, and said regenerable sorbent is subsequently regenerated by heating said regenerable sorbent to a second temperature at which sulphur compounds are desorbed from said regenerable sorbent, said heating being effected by contacting said regenerable sorbent with a regeneration fluid stream comprising a heated part stream from said product stream, thereby producing the sulphur compound-laden concentrate stream.

3. A process according to claim 2 wherein the regenerable solid sorbent is in the form of at least two sorbent beds which are used in parallel such that whilst one bed is regenerating another receives the feedstock stream.

4. A process according to claim 2, wherein the heating of the regenerating fluid prior to passage through the regenerable solid sorbent is effected, in at least part, by indirect heat exchange with the concentrate stream.

5. A process according to claim 2 wherein the sorption step is effected at a temperature between 0° and 100° C., and the regeneration step is effected at a temperature at least 50° C. higher than the sorption step.

6. A process according to claim 3 wherein at least three beds of said regenerable sorbent are employed and while said feedstock stream is contacted with regenerable solid sorbent in a first bed at the first temperature giving the product stream, (a) regenerating a bed of said regenerable solid sorbent, with which the feedstock stream has previously been contacted, by heating said regenerable sorbent to the second temperature by contacting said regenerable sorbent with the regeneration fluid stream; and (b) cooling a third bed of said regenerable solid sorbent, that has previously been regenerated by heating to said second temperature, from said second temperature to said first temperature.

7. A process according to claim 6 wherein at least the initial part of said cooling from the second temperature is effected by passing a part stream of said product stream through said bed undergoing cooling and then heating said product stream after passage through said bed undergoing cooling to said second temperature and using it as the regeneration fluid stream for the bed undergoing regeneration.

8. A process according to claim 1 wherein the concentrate stream fed to the hydro-desulphurisation catalyst also includes carbon monoxide and steam and the hydro-desulphurisation catalyst is such that it has activity, at the temperature at which the hydro-desulphurisation is effected, for the shift reaction whereby hydrogen is also formed by the shift reaction between the carbon monoxide and steam present in the concentrate stream as it is fed over the hydro-desulphurisation catalyst.

9. A process according to claim 1 wherein the concentrate stream fed to the hydro-desulphurisation catalyst also includes an organic compound which can be reformed to give hydrogen and the hydro-desulphurisation catalyst is such that is has activity, at the temperature at which the hydro-desulphurisation is effected, for reforming said organic compound whereby hydrogen is also formed by such reforming as the concentrate stream is fed over the hydro-desulphurisation catalyst.

10. A process according to claim 1 wherein the hydrogen sulphide is removed from the hydrogen sulphide-containing stream by sorption with a sorbent comprising zinc oxide.

* * * * *